(12) United States Patent
Ghahary (10) Patent No.: US 7,154,727 B2
(45) Date of Patent: Dec. 26, 2006

(54) SURGE PROTECTION CIRCUIT

(75) Inventor: Ali Ghahary, Bridgewater, NJ (US)

(73) Assignee: Analog Devices, Norwood, MA (US)

( * ) Notice: Subject to any disclaimer, the term of this patent is extended or adjusted under 35 U.S.C. 154(b) by 250 days.

(21) Appl. No.: 10/638,671

(22) Filed: Aug. 11, 2003

(65) Prior Publication Data

US 2004/0095702 A1   May 20, 2004

Related U.S. Application Data

(60) Provisional application No. 60/420,663, filed on Oct. 23, 2002.

(51) Int. Cl.
*H02H 3/22* (2006.01)

(52) U.S. Cl. .................... 361/119; 361/118

(58) Field of Classification Search ............. 361/119, 361/118
See application file for complete search history.

(56) References Cited

U.S. PATENT DOCUMENTS

| | | | | |
|---|---|---|---|---|
| 3,181,033 A | * | 4/1965 | Bakker | 361/119 |
| 4,577,255 A | * | 3/1986 | Martin | 361/119 |
| 5,122,921 A | * | 6/1992 | Koss | 361/111 |
| 6,134,093 A | * | 10/2000 | Masghati | 361/119 |
| 6,144,737 A | * | 11/2000 | Maruyama et al. | 379/413 |
| 6,226,166 B1 | * | 5/2001 | Gumley et al. | 361/118 |
| 6,252,755 B1 | * | 6/2001 | Willer | 361/119 |
| 6,377,435 B1 | * | 4/2002 | Nabell et al. | 361/119 |
| 6,385,030 B1 | * | 5/2002 | Beene | 361/119 |
| 6,842,518 B1 | * | 1/2005 | Chen et al. | 379/398 |

* cited by examiner

*Primary Examiner*—Chau N. Nguyen
*Assistant Examiner*—Scott Bauer
(74) *Attorney, Agent, or Firm*—Wolf Greenfield & Sacks, PC (57) ABSTRACT

Methods of protecting against a surge voltage and apparatus for performing the same. One embodiment of the invention is directed to a circuit to protect a device from a surge voltage. The circuit is connected between the device and first and second nodes to which the surge voltage may be applied. A charge storage device is connected between third and fourth nodes and the device is operatively connected to the third node and a fifth node. The circuit comprises a first overvoltage protection device coupled between the fourth node and a fifth node, the fourth and fifth nodes being operatively connected to the first and second nodes, respectively, and a second overvoltage protection device coupled between the third node and the fifth node. A voltage between the third and fifth nodes during the surge voltage is substantially less than a switching voltage of the second overvoltage protection device for at least a portion of the duration of the surge voltage.

25 Claims, 7 Drawing Sheets

SURGE PROTECTION CIRCUIT

CROSS-REFERENCE TO RELATED APPLICATIONS

This application claims the benefit, under 35 U.S.C. §119(e), of the filing date of U.S. provisional application Ser. No. 60/420,663 entitled "Surge Protection Circuit," filed Oct. 23, 2002 and incorporated herein by reference.

FIELD OF THE INVENTION

The present invention relates generally to the field of overvoltage protection circuits and methods.

BACKGROUND OF THE INVENTION

Overvoltage protection circuits are used to protect electronic devices from transient voltages or "power surges." Such a power surge may occur when power or signal lines supplying a device experience an increase in voltage above a safe or acceptable level. To give but one example, modems connected to telephone lines require protection from surges on both their power lines and the telephone lines. A conventional overvoltage protection circuit is shown in FIG. 1.

Figure 1:
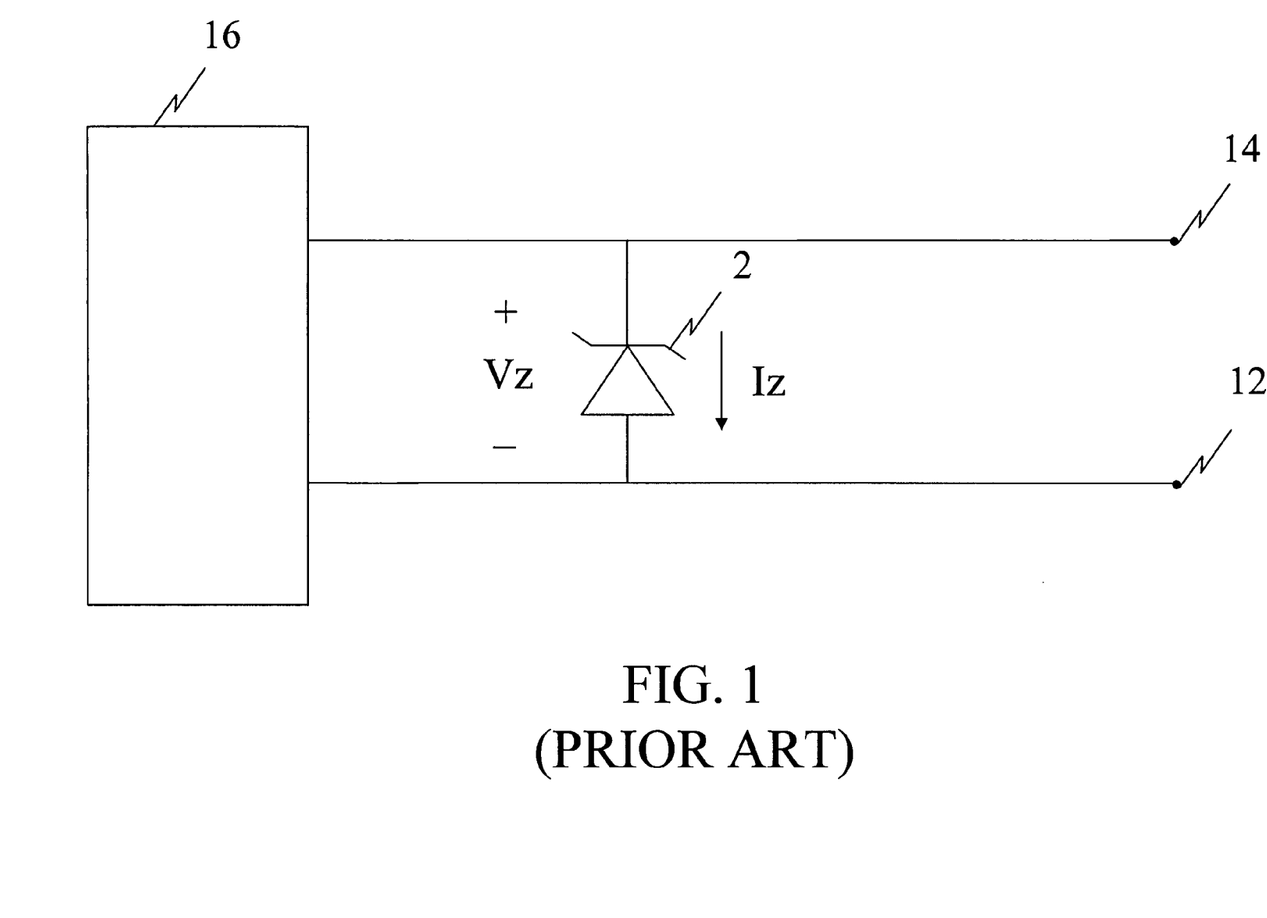
FIG. 1 illustrates a schematic diagram of a conventional overvoltage protection circuit.
Figure 2:
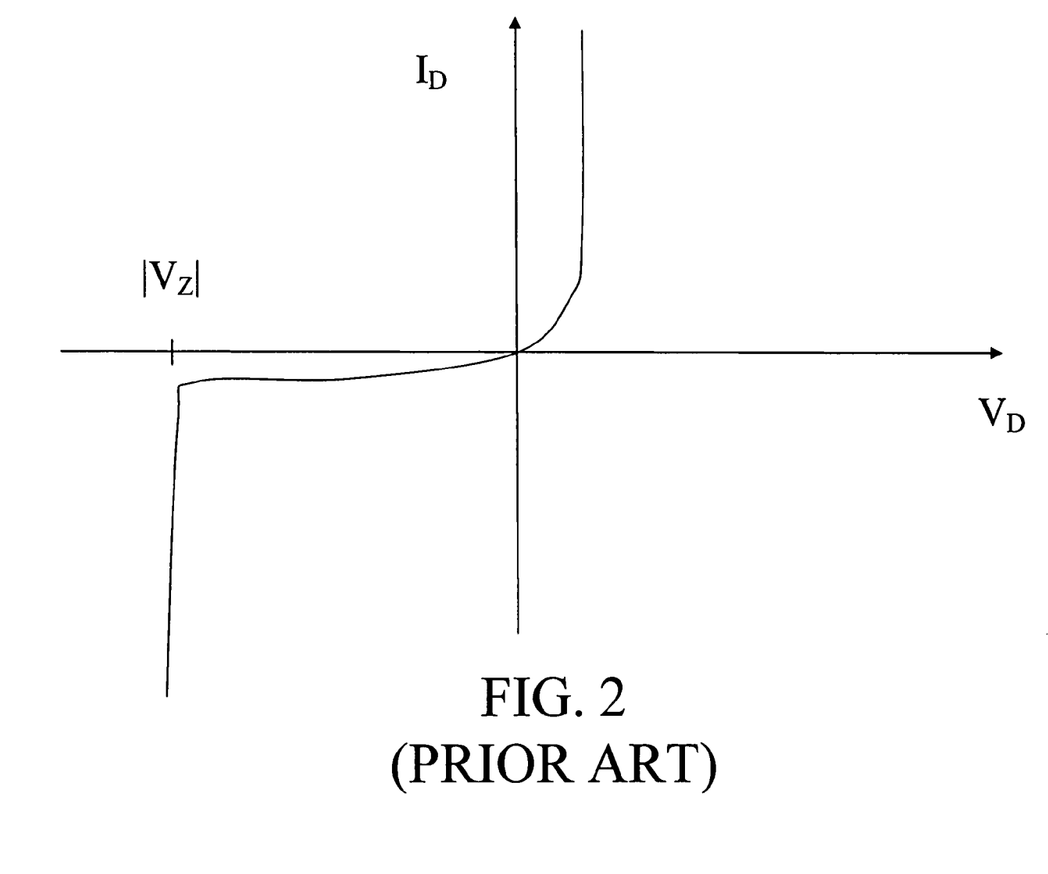
FIG. 2 illustrates a graph of the current-voltage characteristics of a zener diode.

The overvoltage protection circuit of FIG. 1 is arranged to protect a load 16 from an overvoltage occurring across nodes 14, 12. The circuit comprises a zener diode 2 connected across the nodes 14, 12. The current-voltage characteristics of a typical zener diode are illustrated in FIG. 2, which shows the current ID through the zener diode with respect to the voltage $V_D$ across the zener diode. As shown, when the reverse-bias voltage applied to a zener diode reaches the breakdown voltage $|V_z|$, the current through the zener diode increases rapidly while the voltage across the diode remains substantially constant.

Hence, the zener diode 2 of FIG. 1 will conduct reverse-bias current $I_z$ when the voltage across the diode approximates the breakdown voltage $|V_z|$. The breakdown voltage of the zener diode 2 may be chosen so that the diode conducts current when the voltage across nodes 14, 12 is at a particular threshold voltage.

Applicant has appreciated certain disadvantages in the overvoltage protection circuit of FIG. 1 and related circuits. In particular, although the circuit of FIG. 1 operates to substantially prevent the full surge voltage from appearing at the load 16, the load 16 is exposed to the threshold voltage (i.e., breakdown voltage) of the zener diode 2 during the voltage surge. In certain applications, the exposure of the load 16 to the threshold voltage for this time period may be harmful to the device. However, if a zener diode with a lower threshold voltage is used, it may be triggered by signal and low-level noise, rather than surges alone. In addition, the load 16 will be exposed to the full surge voltage for a brief period before the voltage across the load 16 is stabilized at the threshold voltage. Exposure to the full surge voltage, even for a brief period of time, may also be harmful to the device.

It should be appreciated that while the exemplary conventional overvoltage protection circuit of FIG. 1 uses a zener diode 2, other conventional overvoltage protection circuits may use another device (e.g., a SIDACtor® device) in place of the zener diode. Such circuits also exhibit the deficiency of not preventing exposure of the device to the full surge voltage for the entire duration of the surge.

A further complication is presented by the reactive nature of some loads. For example, to meet the impedance specifications for loads intended for telephone line connections, a modem or other line interface often will have the configuration of FIG. 3, wherein a capacitance C is connected in series between (for balance) a pair of transformer windings L1 and L2 through which a connection is made to the tip (T) and ring (R) conductors of a standard telephone circuit. The protected device 17 is connected to one or more opposing transformer windings L3. The net effect of the series L-C circuit is to aggravate the problem of protecting device 17 from large surges across the tip and ring lines. If a zener diode is used, it effectively short circuits the series arrangement of L1, L2 and C, forming an undamped resonant circuit that could drive a high amplitude from winding(s) L3 into device 17, repeatedly.

Accordingly, a need exists for an overvoltage protection circuit suitable for use in telephone circuits and which does not expose the protected device to voltages at or above its threshold level for a time sufficient to do permanent damage—e.g., the full duration of the surge. The threshold level may be sufficiently high so that the overvoltage protection circuit is not triggered into a protective mode by mere noise.

SUMMARY OF THE INVENTION

This need is addressed by the present invention. One embodiment of the invention is directed to a protective circuit which may be interposed between a device or apparatus requiring protection and conductors that must connect operatively to the device or apparatus. The protective circuit protects against a surge voltage on the conductors, the circuit being connected between a load coupled to the device and first and second nodes on the conductors to which the surge voltage may be applied. The circuit is connected between the device and first and second nodes to which the surge voltage may be applied. A charge storage device is connected between third and fourth nodes and the device is operatively connected to the third node and a fifth node. It should be appreciated that the terms "coupled, "connected," and "operatively connected" are used interchangeably herein. The circuit comprises a first overvoltage protection device coupled between the fourth node and a fifth node, the fourth and fifth nodes being operatively connected to the first and second nodes, respectively, and a second overvoltage protection device coupled between the third node and the fifth node. A voltage between the third and fifth nodes during the surge voltage is substantially less than a switching voltage of the second overvoltage protection device for at least a portion of the duration of the surge voltage. An interface comprising one or more electronic components may be coupled between the third and fifth nodes.

Another embodiment of the invention is directed to a method of limiting exposure of a load to a surge voltage via a protective interface between the load and the surge voltage. The method comprises acts of charging a capacitor with the surge voltage, discharging the capacitor through a first overvoltage protection device, and driving the load with a discharge current of the capacitor. The method further comprises an act, when a voltage across the load exceeds a switching voltage of a second overvoltage protection device, of passing the discharge current through the second overvoltage protection device, wherein voltage across the load is substantially less than a switching voltage of the second overvoltage protection device for at least a portion of the duration of the surge voltage.

A further embodiment of the invention is directed to a method of limiting an exposure of a load to a surge voltage. The method comprises acts of passing current through a first overvoltage protection device and, when a voltage across the load exceeds a switching voltage of a second overvoltage protection device, passing the current through the second overvoltage protection device, wherein a voltage across the load is substantially less than a switching voltage of the second overvoltage protection device for at least a portion of the duration of the surge voltage.

Another embodiment of the invention is directed to a circuit to protect a device from a surge voltage. The circuit is connected between the device and first and second nodes to which the surge voltage may be applied. The circuit comprises an isolation barrier coupled between the device and third and fifth nodes and a charge storage device connected between the third node and a fourth node. The circuit further comprises a first overvoltage protection device coupled between the fourth node and a fifth node, the fourth and fifth nodes being operatively connected to the first and second nodes, respectively, and a second overvoltage protection device coupled between the third node and the fifth node. The voltage between the third and fifth nodes during the surge voltage is substantially less than a switching voltage of the second overvoltage protection device for at least a portion of the duration of the surge voltage.

DETAILED DESCRIPTION

In view of the foregoing, one embodiment of the invention is directed to an overvoltage protection circuit that prevents the full surge voltage from appearing at a load coupled to the circuit. In one example, the full surge voltage is prevented from appearing at the load for the full duration of the surge. Another embodiment of the invention is directed to an overvoltage protection circuit that prevents a threshold voltage (e.g., a voltage at which the circuit is triggered into its protective mode) from appearing at the load. The threshold voltage may be prevented from appearing at the load for a portion of the duration of the surge or the full duration of the surge.

Figure 3:
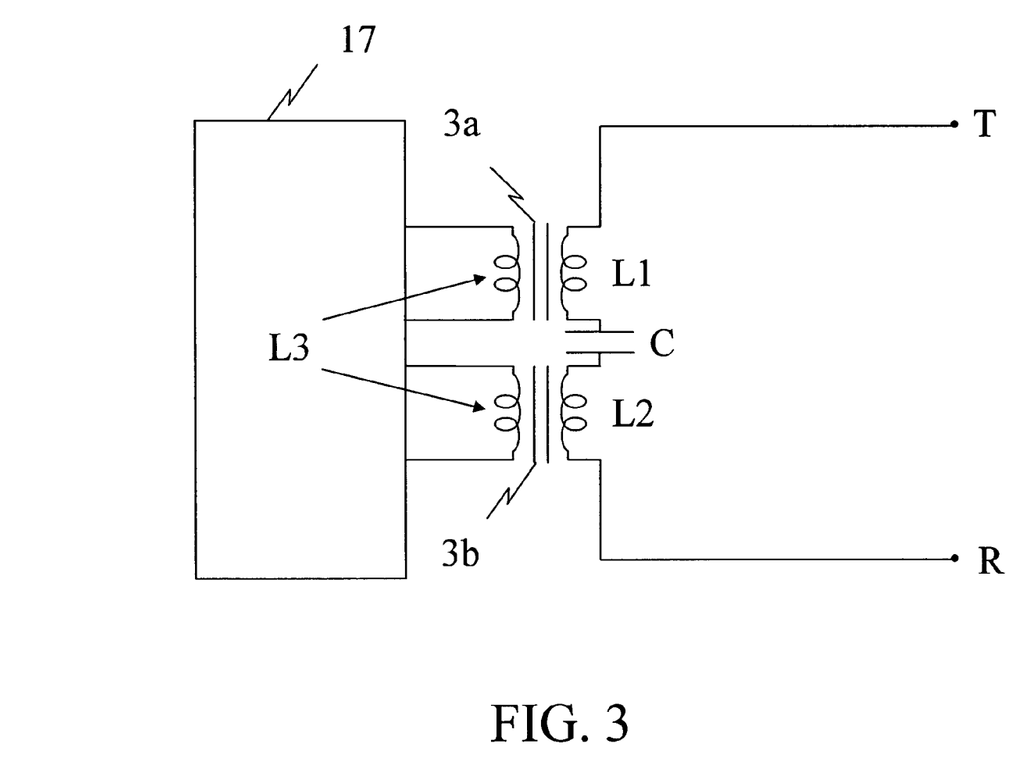
FIG. 3 illustrates a schematic diagram of a conventional interface between a device and a surge protection circuit.
Figure 4:
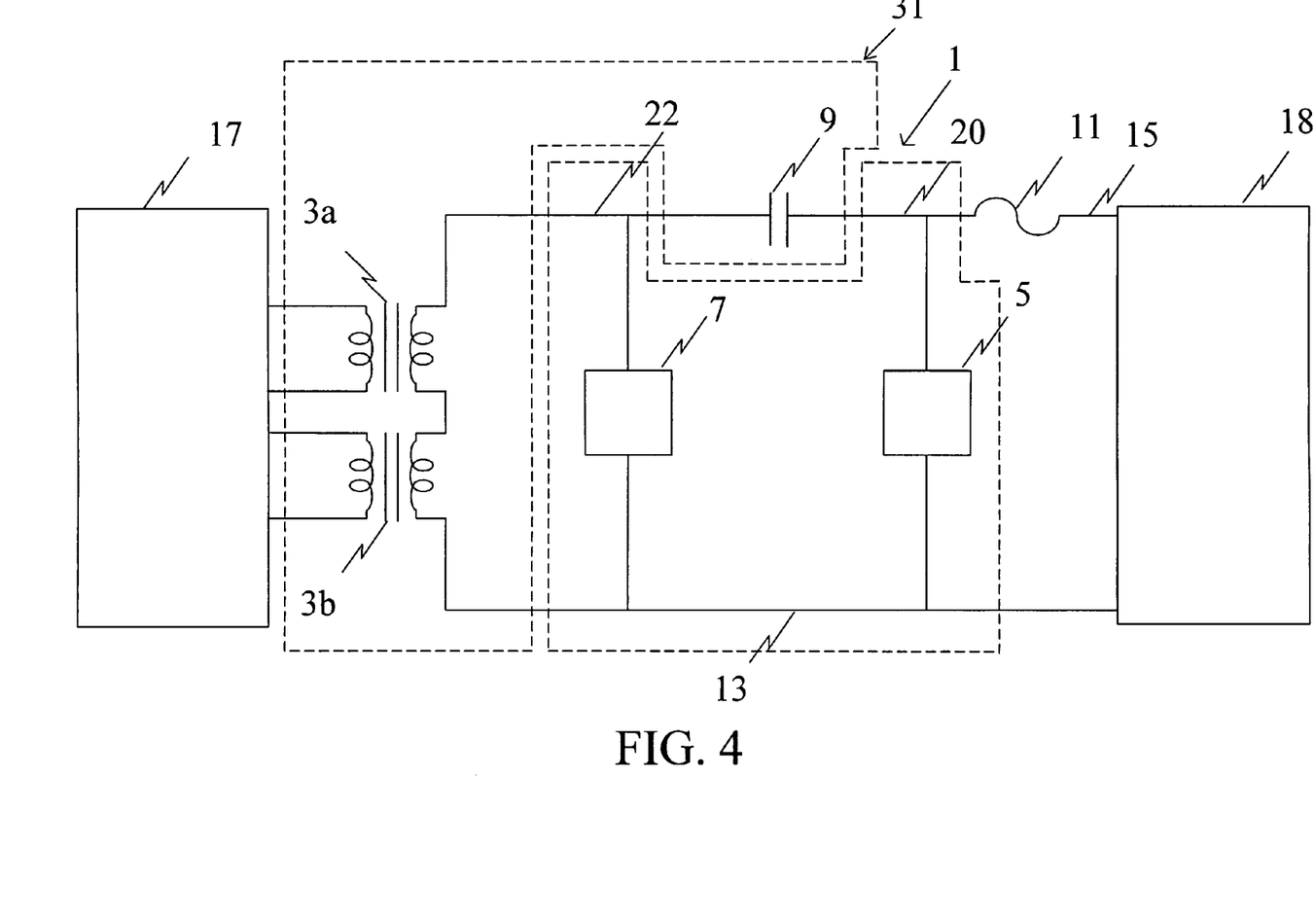
FIG. 4 illustrates a schematic diagram of an overvoltage protection circuit according to one embodiment of the invention.

FIG. 4 illustrates one embodiment of a protection circuit according to the invention in which a circuit 1 operates to protect device 17 from an overvoltage occurring across nodes 15, 13. The surge protection circuit 1 is coupled with an isolation barrier and impedance-matching network formed by transformers 3a and 3b and capacitor 9, although it should be appreciated that other transformer configurations may be used. The impedance-matching capacitor C of FIG. 3 has been moved from between the windings of L1 and L2 on the "line" side of the barrier to a series position between one of the line conductors and the windings of transformers 3a and 3b. This permits the surge protection circuit to be formed by a first overvoltage protection device 5 and a second overvoltage protection device 7. The first overvoltage protection device 5 is connected between the node 20 and the node 13. The second overvoltage protection device 7 is connected between the node 22 and the node 13. The surge protection circuit 1, together with the isolation barrier/impedance network 31, may be connected as an interface between a circuit 18 (e.g., an interface to the public switched telephone network) and the device 17.

Capacitor 9 is shown as not being part of the surge protection circuit 1 as its inclusion may be required for other purposes. For example, capacitor 9 may be required to be used with the surge protection circuit for a reason unrelated to surge protection, such as to establish the correct impedance of the circuit. Although the capacitor 9 is shown as not being part of the surge protection circuit 1, it may be functionally involved in the surge protection operation. Therefore, it would be just as proper to define a surge protection circuit including capacitor 9. Capacitor 9 may be connected between the first and second overvoltage protection devices 5, 7 at nodes 20 and 22. The capacitor 9 may be included to adjust the impedance presented to circuit 18 in accordance with regulatory standards that define acceptable input impedance levels for certain circuits. For example, regulatory standards may set acceptable impedance specifications for the devices connected to digital subscriber lines for DSL service, requiring the inclusion of a capacitance in series with an inductance. The configuration of overvoltage protection devices 5 and 7 and capacitor 9 minimizes the appearance at the line input of device 17 of voltage spikes that otherwise damage device 17 in their absence.

Circuit 18 may, for example, be an interface including a signaling circuit connected across a phone line at nodes 13, 15. For example, the lines connected to nodes 13 and 15 may be, respectively, the ring line and tip line of a telephone system. However, it should be appreciated that instead of ring and tip lines, nodes 13 and 15 may be connected to other communication lines or lines that conduct power, rather than signals, to or from device 17. A fuse 11 is also illustrated in FIG. 4 and optionally may be included along the line between node 20 and node 15 to stop the conduction of current along the line should the current increase beyond an acceptable level.

Device 17 may be a chip or a circuit including components sensitive to voltage surges. For example, device 17 may be an asymmetric digital subscriber line (ADSL) transceiver chip or chipset, such as an AD6493 line-interface circuit of a transceiver chipset, manufactured by Analog Devices, Inc. of Norwood, Mass., USA.

When the voltage applied across nodes 13 and 15 suddenly increases (surges) from a nominal level to a high, excessive level, it causes the capacitor 9 to charge. The voltage on capacitor 9 will increase until it exceeds the switching voltage of the first overvoltage protection device 5. At that point, the device 5 "crowbars," or switches from a high off-state impedance to a low on-state impedance and conducts current. When this occurs, the capacitor 9 discharges through the first overvoltage protection device 5. The voltage across the right-hand ("line" side) windings of transformers 3a, 3b, which are connected in parallel with the second overvoltage protection device 7, then increases until it exceeds the switching voltage of the second overvoltage protection device 7. At this point, the second overvoltage protection device 7 also crowbars and the discharge current of the capacitor 9 travels in a conductive loop that includes the first and second overvoltage protection devices 5, 7 and the capacitor 9.

Figure 5:
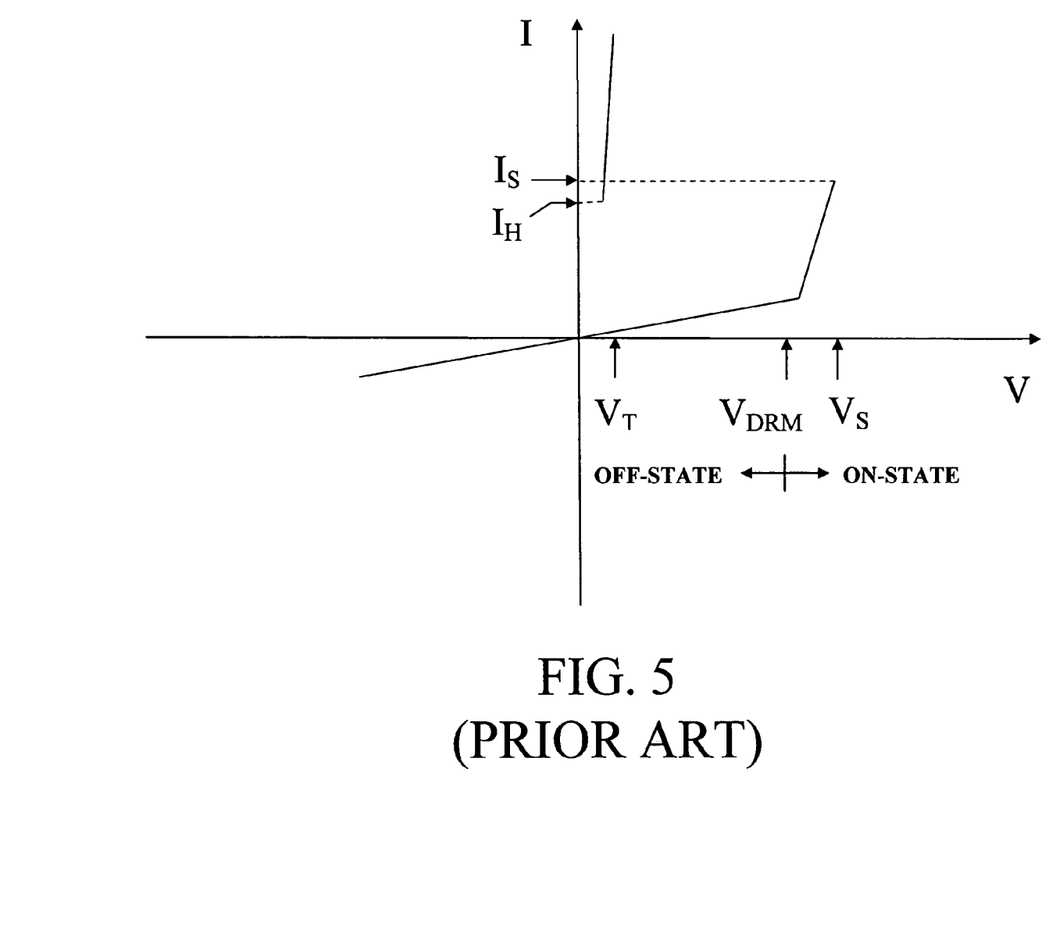
FIG. 5 illustrates a graph of the current-voltage characteristics of a SIDACtor® device.

According to one implementation of the circuit 1, at least one (and preferably both) of the overvoltage protection devices 5, 7 has a higher switching voltage than clamping voltage. In other words, the voltage required to switch the overvoltage protection devices 5, 7 to an on-state may be higher than the voltage across the device when the device is passing current. SIDACtor® devices manufactured by Teccor Electronics of 1800 Hurd Drive, Irving, Tex. USA, are but one example of suitable devices that may have a higher switching voltage than clamping voltage. A SIDACtor® device operates much like a switch, with its state being controlled by the voltage across it and current through it. FIG. 5 illustrates the current-voltage characteristics of a typical SIDACtor® device. As shown, the device has an on-state in which it conducts current and an off-state in which it exhibits low leakage currents (less than 5 μA, typically). When the voltage across the SIDACtor® device exceeds the peak off-state voltage $V_{DRM}$, the device exhibits characteristics similar to an avalanche diode, allowing increased current through the device. When the current supplied to the device exceeds the switching current $I_S$, the device switches to the on-state and is able to sink large amounts of current. In this state, a voltage drop $V_T$, lower than $V_{DRM}$, exists across the device. When the current through the device falls below a minimum holding current $I_H$, the device resets and returns to the off-state. Although embodiments of the invention may employ SIDACtor® devices as the protection devices, it should be appreciated that the invention is not limited in this respect. Other types of thyristors or other avalanche or overvoltage protection devices having a voltage drop across the device that is less than the turn-on voltage when the device is in the on-state may alternatively be used.

Figure 6:
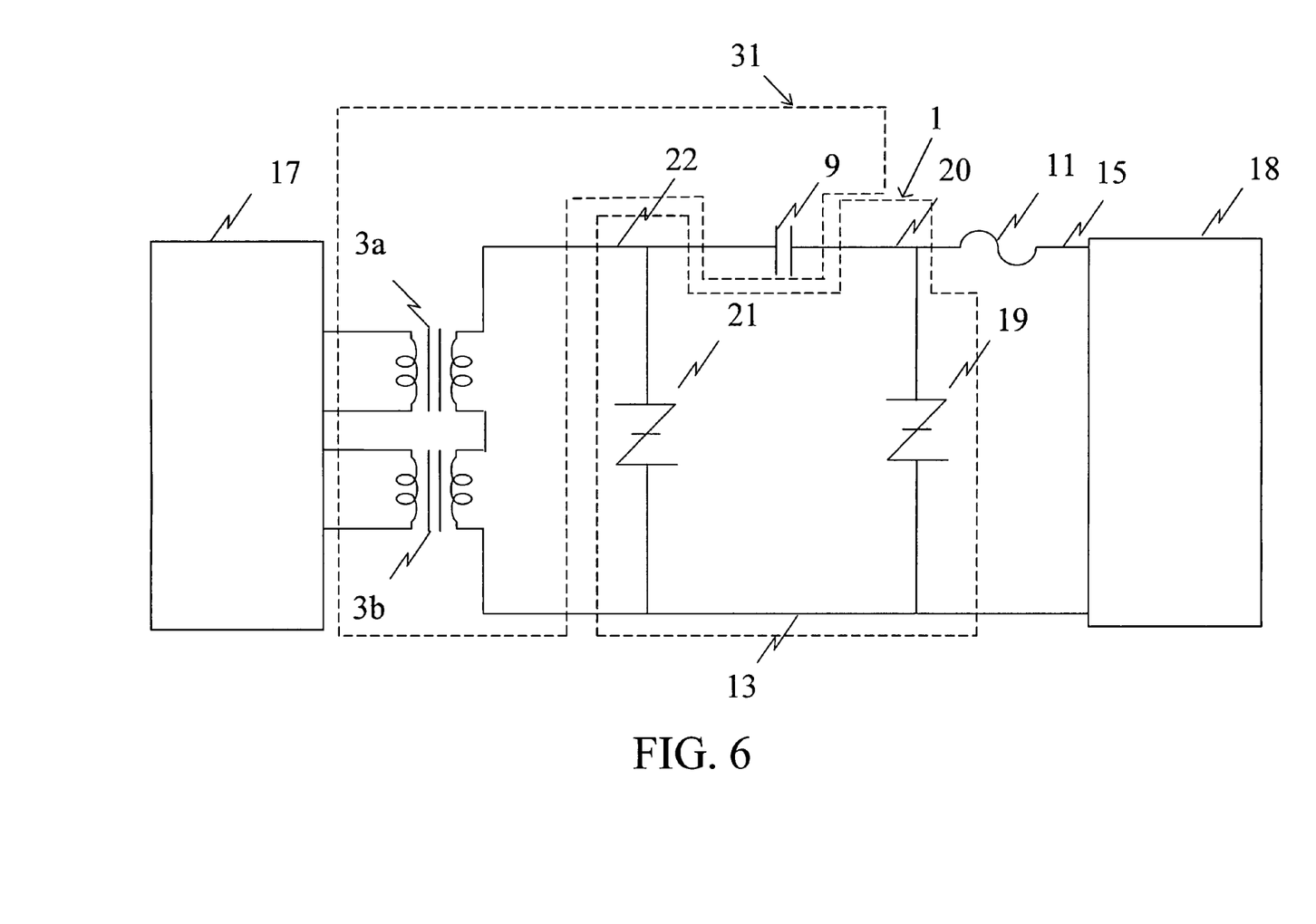
FIG. 6 illustrates a schematic diagram of an overvoltage protection circuit according to another embodiment of the invention.

FIG. 6 shows an exemplary implementation of the surge protection circuit 1 of FIG. 4. In this implementation, the first overvoltage protection device 5 of FIG. 3 is implemented with a first SIDACtor® device 19 having a switching voltage between approximately 320V and 400V, or approximately 350V (e.g., Teccor product numbers P3500SC or P3500EC). The second overvoltage protection device 7 of FIG. 4 is implemented with a second SIDACtor® device 21 having a switching voltage between approximately 25V and 40V, or approximately 30V (e.g., Teccor product numbers P0300SB or P0300EB). Capacitor 9 may have specifications of approximately 0.027 μF/400V. In this scheme, the first SIDACtor® device 19 limits most of the surge generator energy seen by the circuit 17. In addition, the second SIDACtor® device 21 limits the discharge energy from the capacitor 9 seen by the transformers 3a, 3b. Because a SIDACtor® device experiences a low voltage drop $V_T$ across the device relative to the switching voltage $V_S$ when the device is in the on-state, as shown on FIG. 5, the device 17 of FIG. 6 is not exposed to the switching voltage $V_S$ for the full duration of the voltage surge. Rather, the device 17 is only briefly exposed to the switching voltage $V_S$, for example for a duration on the order of microseconds. Once the current through the second SIDACtor® device 21 reaches $I_S$, the voltage across the SIDACtor® device 21 drops to $V_T$, such that the device 17 is exposed to little or no voltage from the surge. For the SIDACtor® devices having Teccor product numbers P3500SC, P3500EC, P0300SB and P0300EB, noted above, the current $I_S$ has a maximum of approximately 800 mA and the voltage $V_T$ has a maximum of approximately 4V.

The circuit in FIG. 4 has been subjected to several rounds of lightning and power induction tests. The tests were conducted per Bellcore GR-1089 first level lightning specifications and ITU K.20 lightning and power induction recommendations. In all cases the performance of the system was compared before and after the testing, and no performance degradation was observed. Table 1, below, shows a summary of the tests performed:

TABLE 1

| Test | Peak Voltage (Volts) | Peak Short-Circuit Current (Amps) | Test Duration |
|---|---|---|---|
| Bellcore GR-1089 First-level test #3 | 1000 | 100 | 10/1000 uS |
| ITU K.20 Lightning | 1000 | 25 | 10/700 uS |
| ITU K.20 Lightning | 4000 | 100 | 10/700 uS |
| ITU K.20 Power induction | 600 | 1 | 0.2 S |
| ITU K.20 Power induction | 600 | 1 | 1 S |

Figure 7:
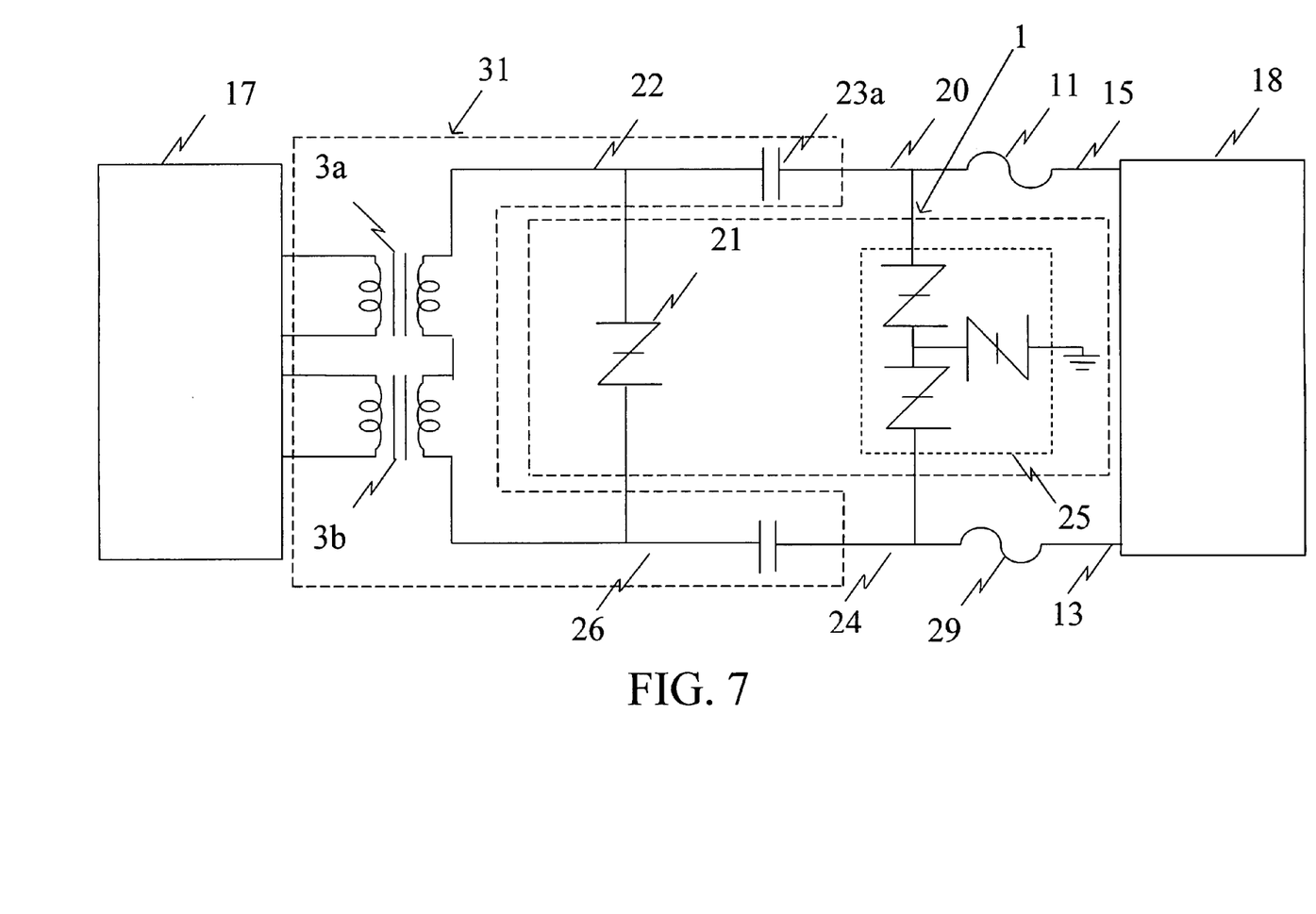
FIG. 7 illustrates a schematic diagram of an overvoltage protection circuit according to a further embodiment of the invention.

As shown in FIG. 7, certain components optionally may be added to or substituted for the components of the exemplary circuit implementation shown in FIG. 6. For example, for applications requiring an earth ground connection, a balanced, three-terminal SIDACtor® device 25 (e.g., Teccor product numbers P3403UC or P3403AC) may used in place of the SIDACtor® device 19 of FIG. 6, and an additional fuse 29 may be included between nodes 24 and 13. For the SIDACtor® devices having Teccor product numbers P3403UC and P3403AC, the switching voltage is approximately 350V, the current $I_S$ has a maximum of approximately 800 mA, and the voltage $V_T$ has a maximum of approximately 8V. For applications not requiring an earth ground connection, a two-terminal device may be used to provide only differential-mode protection, and a single fuse may be used. For applications requiring improved longitudinal balance, capacitors 23a, 23b may be placed between SIDACtor® devices 21 and 25 and, in particular, between nodes 20, 22 and nodes 24, 26, respectively. Capacitors 23a, 23b may have specifications of approximately 0.056 μF/250V.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A circuit to protect a protected device from a surge voltage, the circuit being connected between said device and first and second nodes to which the surge voltage may be applied, wherein a charge storage device is connected between third and fourth nodes and the protected device is operatively connected to the third node and a fifth node, the circuit comprising:

a first overvoltage protection device coupled between the fourth node and the fifth node, the fourth and fifth nodes being operatively connected to the first and second nodes, respectively, a clamping voltage of the first overvoltage protection device being less than a switching voltage of the first overvoltage protection device; and a second overvoltage protection device coupled between the third node and the fifth node;

wherein a voltage between the third and fifth nodes during the surge voltage is substantially less than a switching voltage of the second overvoltage protection device for at least a portion of the duration of the surge voltage, wherein the second overvoltage protection device comprises a SIDACtor® device, and wherein the first overvoltage protection device comprises a SIDACtor® device.

2. The circuit of claim 1, wherein an interface comprising one or more electronic components is coupled between the third and fifth nodes and the protected device.

3. The circuit of claim 1, wherein a clamping voltage of the second overvoltage protection device is less than a switching voltage of the second overvoltage protection device.

4. The circuit of claim 1, wherein a switching voltage of the first overvoltage protection device is higher than the switching voltage of the second overvoltage protection device.

5. The circuit of claim 4, wherein the switching voltage of the first overvoltage protection device is approximately 350V and the switching voltage of the second overvoltage protection device is approximately 30V.

6. The circuit of claim 1, wherein the protected device operatively connected to the third node and the fifth node comprises a load.

7. The circuit of claim 1, wherein at least one winding of a transformer is coupled between the third and fifth nodes.

8. The circuit of claim 7, wherein the protected device includes an asymmetric digital subscriber line transceiver chip coupled to the third and fifth nodes through said transformer.

9. The circuit of claim 1, further comprising a fuse coupled between the first and fourth nodes.

10. The circuit of claim 1, wherein the circuit is arranged such that the voltage between the third and fifth nodes during the surge voltage is less than approximately 4V for at least a portion of the duration of the surge voltage.

11. The circuit of claims 1 or 8, wherein the first node is coupled to a ring line of a telephone system and the second node is coupled to a tip line of the telephone system.

12. The circuit of claim 1, wherein the first overvoltage protection device has first and second terminals coupled to the fourth and fifth nodes, respectively, and a third terminal coupled to ground.

13. The circuit of claim 1, wherein the voltage between the third and fifth nodes during the surge voltage is less than an amplitude of the surge voltage for the duration of the surge voltage.

14. A method of limiting an exposure of a protected device to a surge voltage, comprising acts of:
charging a capacitor with a surge voltage;
discharging the capacitor through a first overvoltage protection device, a clamping voltage of the first overvoltage protection device being less than a switching voltage of the first overvoltage protection device;
driving a transformer in parallel with the protected device with a discharge current of the capacitor; and
when a voltage across the transformer exceeds a switching voltage of a second overvoltage protection device, passing the discharge current through the second overvoltage protection device, wherein a voltage across the transformer is substantially less than a switching voltage of the second overvoltage protection device for at least a portion of the duration of the surge voltage, wherein the act of discharging the capacitor includes discharging the capacitor through a first SIDACtor® device, and wherein the act of passing the discharge current includes passing the discharge current through a second SIDACtor® device.

15. The method of claim 14, wherein the act of discharging the capacitor includes discharging the capacitor through the first overvoltage protection device when the voltage across the first overvoltage protection device is approximately 350V.

16. The method of claim 14, wherein the act of passing the discharge current includes passing the discharge current through the second overvoltage protection device when the voltage across the second overvoltage protection device is approximately 30V.

17. The method of claim 14, further comprising an act of coupling the transformer to an asymmetric digital subscriber line transceiver chip.

18. The method of claim 14, wherein the protected device comprises a device sensitive to the surge voltage.

19. The method of claim 18, wherein the device sensitive to the surge voltage comprises an asymmetric digital subscriber line transceiver.

20. The method of claim 14, wherein the voltage across the transformer is less than an amplitude of the surge voltage for the duration of the surge voltage.

21. A method of limiting an exposure of a protected device to a surge voltage, comprising acts of:
passing current through a first overvoltage protection device, a clamping voltage of the first overvoltage protection device being less than a switching voltage of the first overvoltage protection device; and
when a voltage across a transformer in parallel with the protected device exceeds a switching voltage of a second overvoltage protection device, passing the current through the second overvoltage protection device, wherein a voltage across the transformer is substantially less than a switching voltage of the second overvoltage protection device for at least a portion of the duration of the surge voltage, wherein the second overvoltage protection device comprises a SIDACtor® device, and wherein the first overvoltage protection device comprises a SIDACtor® device.

22. A circuit to protect a device from a surge voltage, the circuit being connected between the device and first and second nodes to which the surge voltage may be applied, the circuit comprising:
an isolation barrier coupled between the device and third and fifth nodes;
a charge storage device connected between the third node and a fourth node;
a first overvoltage protection device coupled between the fourth node and a fifth node, a clamping voltage of the first overvoltage protection device being less than a switching voltage of the first overvoltage protection device, the fourth and fifth nodes being operatively connected to the first and second nodes, respectively; and
a second overvoltage protection device coupled between the third node and the fifth node;
wherein a voltage between the third and fifth nodes during the surge voltage is substantially less than a switching voltage of the second overvoltage protection device for at least a portion of the duration of the surge voltage, wherein the second overvoltage protection device comprises a SIDACtor® device, and wherein the first overvoltage protection device comprises a SIDACtor® device.

23. The circuit of claim 22, wherein the isolation barrier comprises at least one winding of a transformer coupled between the third and fifth nodes.

24. The circuit of claim 23, wherein the device is coupled between sixth and seventh nodes operatively connected to the isolation barrier, and wherein the isolation barrier further comprises at least one winding of the transformer coupled between the sixth and seventh nodes.

25. The circuit of claim 22, wherein the charge storage device comprises a capacitor.

* * * * *